United States Patent Office 3,309,208
Patented Mar. 14, 1967

3,309,208
METHODS FOR CONTROLLING THE THERMAL EXPANSION PROPERTIES OF CERAMICS
Robert H. Arlett, New Brunswick, Sam Di Vita, West Long Branch, and Edward J. Smoke, Metuchen, N.J., assignors, by direct and mesne assignments, to the United States of America as represented by the Secretary of the Army
No Drawing. Filed Apr. 23, 1965, Ser. No. 450,559
1 Claim. (Cl. 106—39)

This application is a continuation-in-part of an application by Edward J. Smoke, Robert H. Arlett and Sam Di Vita, Ser. No. 158,145, filed Dec. 8, 1961, now abandoned.

This invention relates to ceramic bodies having low thermal expansion properties and high thermal shock resistance, and more particularly relates to a method for controlling the thermal expansion properties of ceramic bodies.

Thermal shock resistance in impervious ceramics is determined principally by their linear thermal expansion characteristics. Materials having low coefficients of thermal expansion generally have a high thermal shock resistance. The ideal ceramic would be one having a thermal expansion coefficient of zero over a wide temperature range, or one whose thermal expansion properties could be readily controlled.

A zero coefficient of thermal expansion has been obtained to date only with porous ceramics. However, impervious lithium aluminosilicate-type ceramics which exhibit good thermal-shock properties have been developed. Some lithium aluminosilicate-type ceramics exhibit low through low positive linear thermal expansions, and it has been found that variations in the basic constituents cause slight variations in the coefficients of linear thermal expansion. Unfortunately, it has been quite difficult to accurately control the exact compositional make up of a lithium aluminosilicate-type ceramic. Thus, some method other than compositional variations of the basic materials is needed for effective control of the thermal expansion properties of this type of ceramic.

In accordance with this invention the linear thermal expansion properties of lithium aluminosilicate-type ceramics are controlled by partial substitution of the lithium with a material having a similar ionic radius, for example, magnesium. The ionic radius of a Li$^+$ ion is 0.60 A. and the radius of a Mg$^{++}$ ion is 0.65 A. This ionic substitution has a great effect upon the thermal expansion characteristics of the lithium aluminosilicate-type of ceramics.

Therefore an object of this invention is to control the linear thermal expansion of impervious ceramics.

Another object of this invention is the control of the linear thermal expansion properties of lithium aluminosilicate ceramics.

A further object of this invention is to obtain an impervious ceramic material having exceptional thermal shock resistance properties.

These and other objects will become apparent from the following description.

As was mentioned above, some lithium aluminosilicate ceramics exhibit negative coefficients of thermal expansion over a limited temperature range. That is, the material shrinks when heated. This property lends itself to good thermal shock resistance in a ceramic body. However, we have found that the thermal expansion properties of lithium aluminosilicate-type ceramics can be markedly improved and controlled by the substitution of magnesium oxide for 0.5–9% of the lithium oxide in the base material. More specifically any one of six dif-

LINEAR THERMAL EXPANSION DATA FOR MAGNESIUM LITHIUM ALUMINOSILICATE BODIES

| Linear Thermal Expansion (Percent) | Body Composition (Percent) Magnesium | | | | | | |
|---|---|---|---|---|---|---|---|
| Temperature °C. | 0.0 | 0.5 | 1.0 | 3.0 | 5.0 | 7.0 | 9.0 |
| 100 | −.0022 | −.0020 | +.0005 | −.0055 | −.0040 | +.0100 | +.0180 |
| 200 | −.0035 | −.0034 | −.0005 | −.0175 | −.0100 | +.0320 | +.0370 |
| 300 | −.0010 | −.0010 | +.0020 | −.0290 | −.0160 | +.0480 | +.0500 |
| 400 | +.0030 | +.0060 | +.0080 | −.0370 | −.0190 | +.0635 | +.0600 |
| 500 | +.0110 | +.0150 | +.0200 | −.0420 | −.0190 | +.0790 | +.0700 |
| 600 | +.0280 | +.0265 | +.0318 | −.0430 | +.0170 | +.0943 | +.0800 |
| 700 | +.0390 | +.0340 | +.0368 | −.0400 | −.0110 | +.1090 | +.0900 | ferent percentage substitutions are made, depending upon the expansion characteristics desired. These six different percentages are 0.5, 1, 3, 5, 7 and 9%.

The basic lithium aluminosilicate ceramics in which we substitute magnesium for lithium consists of a frit containing by weight 12.0% Li$_2$O, 8% Al$_2$O$_3$ and 80% SiO$_2$. A binding material such as a hydrous silicate of alumina (clay) corresponding to the formula H$_4$Al$_2$Si$_2$O$_9$ is added to the frit. The ceramic body with the clay added consists of 39.0% clay and 61.0% frit by weight.

We prefer to manufacture our ceramic material in the following manner: The frit is made by dry mixing Li$_2$O, Al$_2$O$_3$, SiO$_2$ and the desired amount of magnesium in the form of magnesium oxide (MgO). The weight of the Li$_2$O is reduced in direct proportion to the weight of the MgO added. The dry mix is melted to a glass and poured into water to quench and retain the glass structure (fritted). The glass frit is dried and reduced to a powder of controlled particle size by milling in a ceramic lined mill. The powder is mixed with water and the clay, and fabricated into a specimen by pressing, casting, or extruding. The specimen is air dried and then fired in an electric kiln at a temperature of 1200° to 1400° C.

The thermal expansion characteristics of our magnesium lithium aluminosilicates are tabulated above.

From the table it can be seen that the substitution of magnesium for lithium has a marked effect on the linear thermal expansion characteristics. The 0.5 and 1% substitutions have little effect on the thermal expansion properties; however the 3 and 5% substitutions of magnesium result in a negative thermal expansion over the temperature range indicated in the table. The 7 and 9% substitutions of magnesium result in a positive linear thermal expansion. Thus we are able to take the basic lithium aluminosilicate which has a coefficient of linear thermal expansion that varies from negative to positive and control its coefficient of expansion in such a manner that the coefficient is either negative over the entire temperature range or entirely positive over the same temperature range. In other words, the substitution of magnesium for lithium in a lithium aluminosilicate makes possible complete control of its linear thermal expansion properties.

The ceramics exhibiting negative expansion from room temperature to 700° C. have the best thermal shock resistance. In fact, bodies formed of these materials have been heated to 1000° F. and dropped into room temperature water without any cracking, breaking or chipping. This test has been repeated numerous times without any damage to the bodies.

It should be noted that the substitution of magnesium for lithium not only allows thermal expansion control but also results in a ceramic that has excellent dielectric properties.

It is to be understood that the composition of the basic lithium aluminosilicate ceramic given above is for illustration purposes only. The linear thermal expansion of any lithium aluminosilicate ceramic may be controlled by substituting magnesium for lithium.

We claim:

A method for controlling the thermal expansion of a ceramic material consisting of 61.0% frit and 39.0% clay; said method comprising dry mixing 0.5–9.0% MgO, 11.5–3% $Li_2O$, 8% $Al_2O_3$ and 80% $SiO_2$, the total of MgO plus $Li_2O$ being 12%; melting said dry mix into a glass, pouring said glass into water to quench and retain the glass structure, thereby forming said frit; air drying said frit; reducing said frit to a powder by milling; mixing said powder with water and said clay; fabricating said powdered frit, water and clay into a specimen; air drying said specimen; and firing said specimen in an electric kiln at a temperature of 1200° to 1400° C.

References Cited by the Examiner

UNITED STATES PATENTS 2,919,995   1/1960   Landron _____ 106—65
3,084,053   4/1963   Arlett et al. _____ 106—39

FOREIGN PATENTS 881,240   11/1961   Great Britain.

HELEN M. McCARTHY, *Primary Examiner.*